United States Patent
Choe et al.

(10) Patent No.: US 11,070,265 B2
(45) Date of Patent: Jul. 20, 2021

(54) SIGNAL TRANSMISSION METHOD AND DEVICE USING BEAMFORMING IN WIRELESS COMMUNICATION SYSTEM

(71) Applicant: Samsung Electronics Co., Ltd., Suwon-si (KR)

(72) Inventors: Balgeum Choe, Suwon-si (KR); Keunchul Hwang, Yongin-si (KR); Hyoyol Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/463,225

(22) PCT Filed: Mar. 9, 2017

(86) PCT No.: PCT/KR2017/002593
§ 371 (c)(1),
(2) Date: May 22, 2019

(87) PCT Pub. No.: WO2018/097411
PCT Pub. Date: May 31, 2018

(65) Prior Publication Data
US 2020/0076486 A1 Mar. 5, 2020

(30) Foreign Application Priority Data

Nov. 28, 2016 (KR) .................. 10-2016-0159411
Feb. 10, 2017 (KR) .................. 10-2017-0018579

(51) Int. Cl.
*H04B 7/06* (2006.01)
*H04B 7/0456* (2017.01)

(52) U.S. Cl.
CPC ......... *H04B 7/0617* (2013.01); *H04B 7/0456* (2013.01); *H04B 7/0632* (2013.01)

(58) Field of Classification Search
CPC .. H04B 7/0617; H04B 7/0456; H04B 7/0632; H04B 7/061; H04B 7/0619; H04B 7/063
See application file for complete search history.

(56) References Cited

U.S. PATENT DOCUMENTS 5,999,826 A * 12/1999 Whinnett ................ H01Q 3/26
455/561
9,001,879 B2 4/2015 Maltsev et al.
(Continued)

FOREIGN PATENT DOCUMENTS

| KR | 10-2011-0004802 A | 1/2011 |
| KR | 10-2013-0127376 A | 11/2013 |
| KR | 10-2016-0102488 A | 8/2016 |

OTHER PUBLICATIONS

Young-Chai Ko et al., 'Channel estimation and analog beam selection for uplink multiuser hybrid beamforming system', EURASIP Journal on Wireless Communications and Networking 2016, Jul. 2, 2016 (URL: http://jwcn-eurasipjournals.sprinreropen.com/articles/10.1186/s13638-016-0618-0).

*Primary Examiner* — Sophia Vlahos
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The disclosure can be applied to an intelligent service (for example, smart home, smart building, smart city, smart car or connected car, health care, digital education, retail, security and safety-related services, and the like) on the basis of 5G communication technology and IoT-related technology. According to an embodiment of the present invention, a method by which a base station transmits a signal in a wireless communication system comprises the steps of: transmitting, to a terminal through at least one beam, at least one beam index including information on (Continued)

beam direction; receiving, from the terminal, a preferred beam index determined by the terminal; determining a channel matrix between the base station and the terminal on the basis of the preferred beam index; and allowing the base station to transmit a signal to the terminal on the basis of the channel matrix. The study has been performed under the support of the "Government-wide Giga KOREA Business" of the Ministry of Science, ICT and Future Planning.

12 Claims, 9 Drawing Sheets

(56) References Cited

U.S. PATENT DOCUMENTS

| | | | |
|---|---|---|---|
| 2004/0204113 A1* | 10/2004 | Kisigami | H04B 7/086 455/562.1 |
| 2009/0318157 A1* | 12/2009 | Hoshino | H04B 7/0452 455/450 |
| 2012/0170619 A1 | 7/2012 | Chang et al. | |
| 2013/0301454 A1 | 11/2013 | Seol et al. | |
| 2013/0343299 A1* | 12/2013 | Sayana | H04B 7/0417 370/329 |
| 2014/0321563 A1* | 10/2014 | Park | H04B 7/0626 375/260 |
| 2015/0103934 A1 | 4/2015 | Nam et al. | |
| 2016/0056871 A1* | 2/2016 | Kakishima | H04B 7/0634 370/336 |
| 2016/0344463 A1 | 11/2016 | Kim et al. | |
| 2017/0033916 A1* | 2/2017 | Stirling-Gallacher | H04L 5/1438 |
| 2017/0244451 A1* | 8/2017 | Raghavan | H04B 7/0408 |
| 2018/0006696 A1* | 1/2018 | Yue | H04B 7/0486 |
| 2018/0123659 A1* | 5/2018 | Qian | H04W 16/28 |
| 2018/0287687 A1* | 10/2018 | Wu | G01S 3/043 |

* cited by examiner

SIGNAL TRANSMISSION METHOD AND DEVICE USING BEAMFORMING IN WIRELESS COMMUNICATION SYSTEM

TECHNICAL FIELD

The disclosure relates to a beamforming-based signal transmission method and device for use in a wireless communication system and, in particular, to a method and device for selecting a beam with a phase shifter and transmitting a signal based on limited channel information in a multi-antenna system environment of the wireless communication system.

This research was conducted with support from the "governmental department Giga KOREA projects".

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

An ultra-high frequency band, e.g., above 30 GHz, that is being considered for designation as a 5G communication technology standard has a wavelength equal to or shorter than 10 mm, and thus is called "millimeter wave frequency band".

One of the main characteristics of the millimeter wave frequency band is the high propagation loss in comparison with a low frequency band. This is because the wave length decreases as the frequency increases; fortunately, the propagation loss caused by the short wavelength of the millimeter wave frequency can be overcome with a beamforming technique using a high-gain analog directional antenna composed of multiple antenna elements. For this reason, multi-antenna-based beamforming design is one of the key features of the millimeter wave frequency band communication.

A beam may be formed in a desired direction by adjusting phases of multiple antenna elements in such a way of applying one of direction-specific phase values stored in a storage device according to a location of a communication counterpart.

Typically, a multiple-input multiple out (MIMO) technique is used to achieve a high data rate. In order to increase the total throughput, it is necessary to communicate simultaneously with multiple mobile terminals that are typically limited in the number of antennas. However, forming multiple beams to multiple terminals simultaneously may cause inter-beam interference, which makes it difficult to achieve desired data rates for the terminals.

DISCLOSURE OF INVENTION

Technical Problem

In order to solve the above problems, the disclosure provides a method for configuring an analog beam pattern capable of minimizing inter-beam interference in consideration of interference directions and removing interference signals at a digital front end as well as estimating channels between a base station and terminals even in an environment where no channel measurement-purpose pilot symbol can be used.

Solution to Problem

According to an embodiment of the disclosure, a signal transmission method of a base station in a wireless communication system includes transmitting at least one beam index including beam direction information to a terminal through at least one beam, receiving a preferred beam index determined by the terminal from the terminal, determining a channel matrix between the base station and the terminal based on the preferred beam index, and transmitting a signal to the terminal based on the channel matrix.

According to another embodiment of the disclosure, a base station of a wireless communication system includes an antenna configured to transmit at least one beam index including beam direction information to a terminal through at least one beam, a phase shifter configured to adjust a beam direction angle of the antenna, and a controller configured to control to receive a preferred beam index determined by the terminal from the terminal, determine a channel matrix between the base station and the terminal based on the preferred beam index, and control the phase shifter to transmit a signal to the terminal based on the channel matrix.

According to another embodiment of the disclosure, a signal reception method of a terminal in a wireless communication system includes receiving at least one beam index including beam direction information from a base station through at least one beam, determining a preferred beam index among the at least one beam index, transmitting the preferred beam index to the base station, and receiving a signal transmitted by the base station based on a channel matrix determined by the preferred beam index.

According to another embodiment of the disclosure, a terminal in a wireless communication system includes a processor configured to control to determine one of at least one beam index received from a base station as a preferred beam index, a transmitter configured to transmit the preferred beam index to the base station, and a receiver configured to receive at least one beam including the at least one beam index from the base station and a signal based on a channel matrix determined by the preferred beam index.

Advantageous Effects of Invention

The disclosure proposes an analog beam management technique in a multiuser MIMO (MU-MIMO) environment without adding extra complexity and provides a method for removing interference signals at a digital front end in an environment where no channel measurement-purpose pilot symbol can be used.

MODE FOR THE INVENTION

Figure 1:
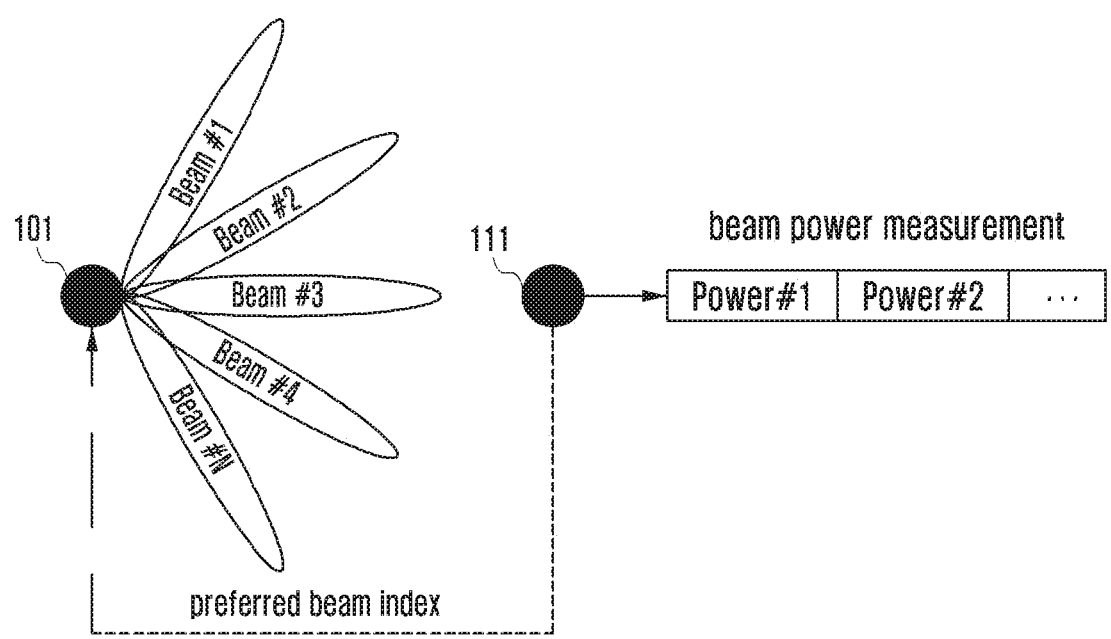
FIG. 1 is a diagram illustrating a beam transmission architecture between a base station and a terminal in a wireless communication system.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 is a diagram illustrating beam index transmission and reception between a base station 101 and a terminal 111 according to an embodiment of the disclosure.

As shown in FIG. 1, the base station 101 forms beams in various directions for the terminal 111. The individual beams are assigned beam indices 1 to N. The terminal 111 may be able to distinguish among the beams based on the beam indices.

The terminal 111 may measure powers of signals received in respective beams and determine a beam index of the beam with the highest power as a preferred beam index. The terminal 111 transmits the preferred beam index to the base station 101.

Although the beams are marked with beam indices #1 to #N in FIG. 1 to help understand the description, the beams may indexed with any types of indices being capable of distinguish among the beams.

Upon receipt of the preferred beam index through the above procedure, the base station may transmit a signal to the terminal based on the corresponding beam index.

Figure 2:
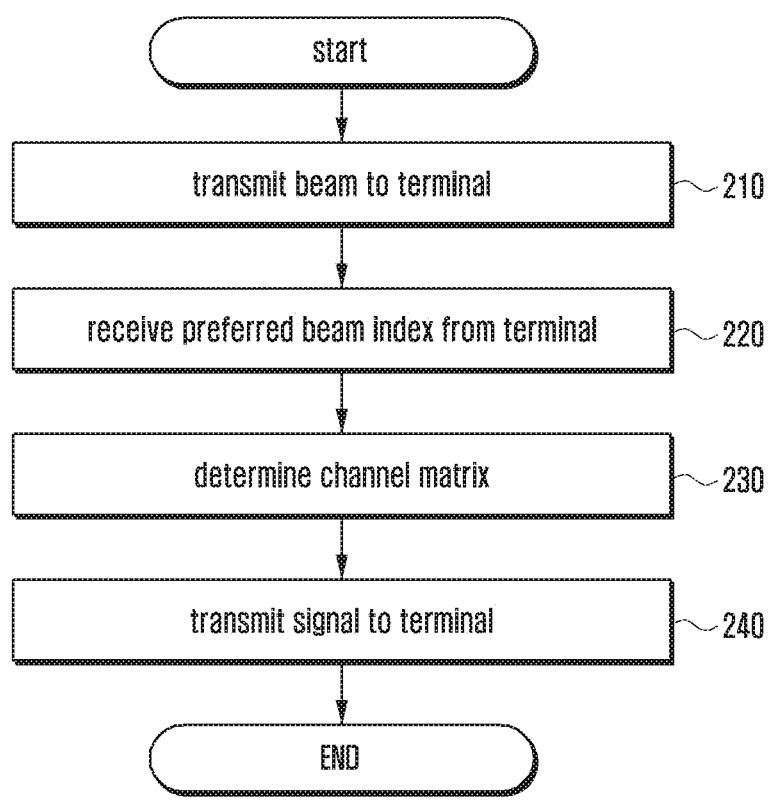
FIG. 2 is a flowchart illustrating a method for a base station to transmit a signal in a wireless communication system according to an embodiment of the disclosure.

A description is made of the procedure for the base station to transmit a signal to the terminal based on the preferred beam index received from the terminal with reference to FIG. 2.

FIG. 2 is a flowchart illustrating a method for a base station to transmit a signal in a wireless communication system according to an embodiment of the disclosure.

At step 210, the base station transmits a beam including a beam index to a terminal. In this case, one or more beams may be formed as shown in FIG. 1. According to an embodiment of the disclosure, the beam index may include beam direction information. The beam direction information may mean a direction of the beam transmitted by the base station. For example, if the beam direction matches the direction to the location of the terminal, an angle formed between the base station and the terminal may be used as the beam direction information.

At step 220, the base station may receive a preferred beam index from the terminal.

As shown in FIG. 1, if N beams including the beam direction information are transmitted to the terminal, the base station receives the preferred beam index from the terminal, the preferred beam index being selected by the terminal through a series of processing procedures. The processing procedures mean the aforementioned method for the terminal to measure the power, which is described in detail later along with the operations of the terminal.

At step 230, the base station may determine a channel matrix between the base station and the terminal based on the preferred beam index. The channel matrix is a mathematical expression for channels established between the base station and the terminal and indicates a channel state between the base station and the terminal.

At step 240, the base station transmits a signal to the terminal based on the channel matrix.

In legacy systems, a pilot symbol is used for estimating a channel state between a base station and a terminal. In order to estimate the channel state using a legacy technology, it is necessary to assume that uplink and downlink channels between the base station and the terminal are identical with each other. Furthermore, the pilot symbol is transmitted using separate time resources, which causes transmission data rate loss at the base station.

The method of the disclosure makes it possible for the base station to estimate a channel state between the base station and the terminal based on a preferred beam index received from the terminal and to transmit a signal efficiently in comparison with the legacy technology.

Figure 3:
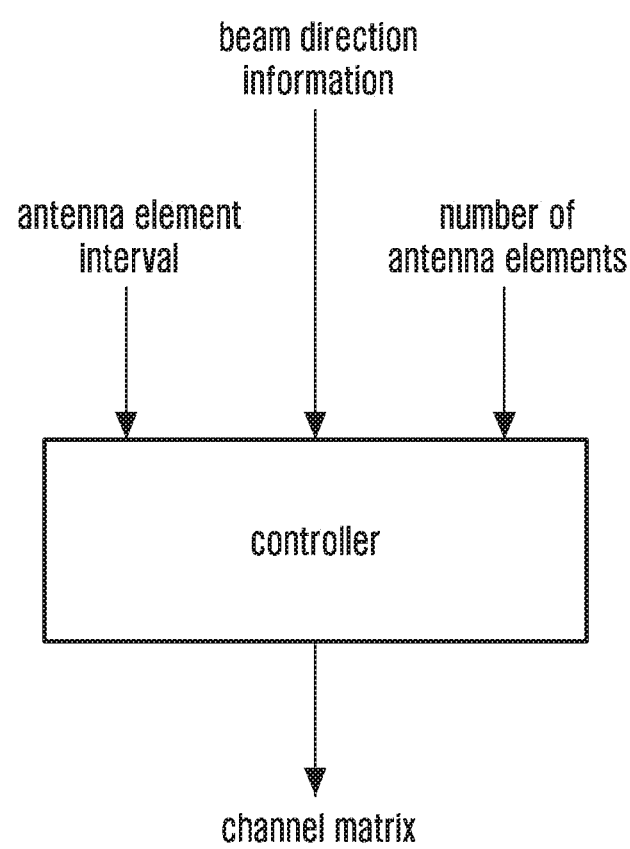
FIG. 3 is a diagram illustrating a method for determining a channel matrix according to an embodiment of the disclosure.

FIG. 3 is a diagram illustrating a method for determining a channel matrix according to an embodiment of the disclosure.

The channel matrix may be determined based on the information on the beam direction, antenna element interval, and number of antenna elements. As above described, the information on the beam direction information may be the beam direction information included in the beam index and, eventually, the angle formed between the base station and the terminal.

Figure 7:
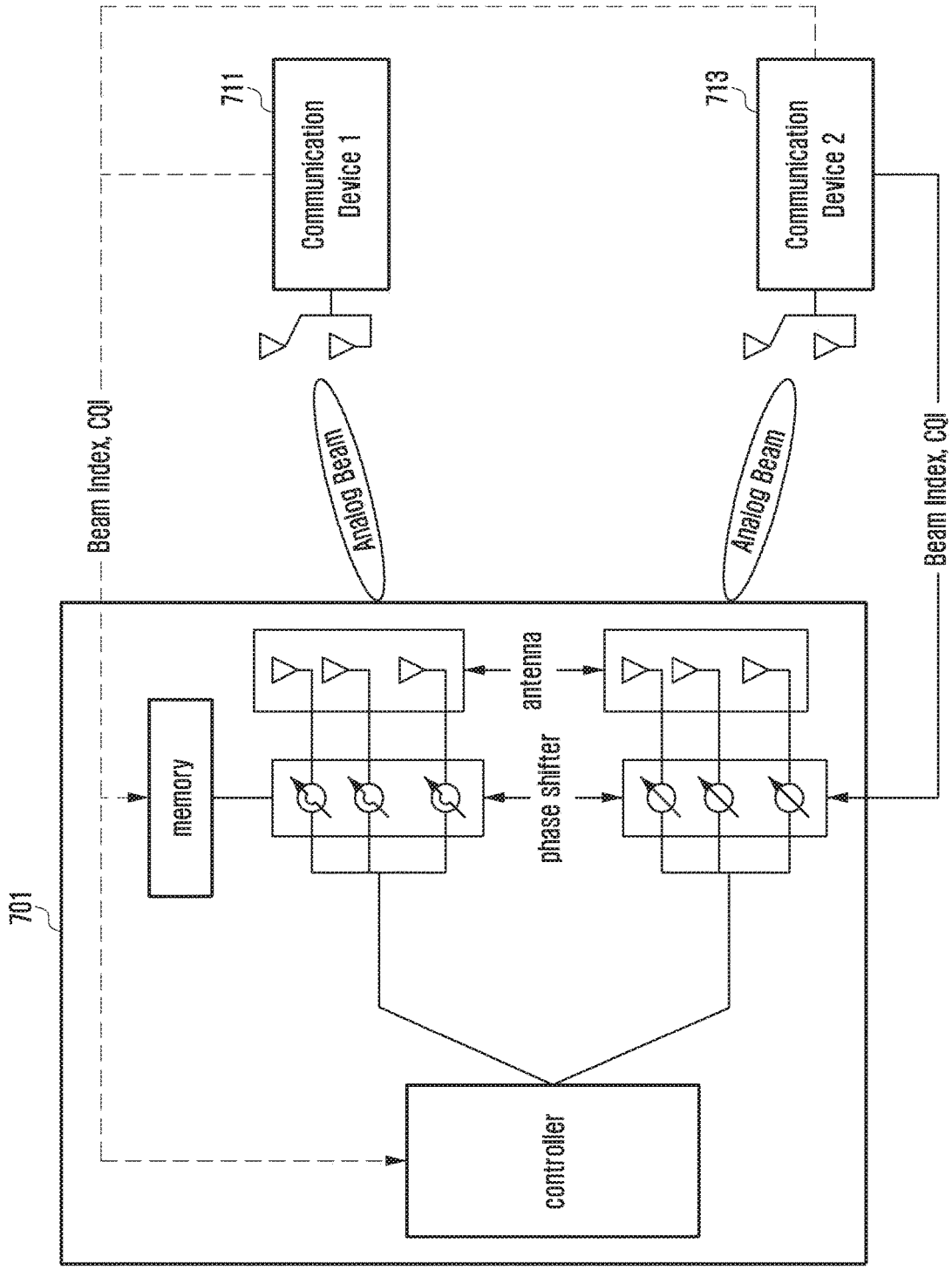
FIG. 7 is a diagram illustrating a communication architecture between a base station and a terminal according to an embodiment of the disclosure.

The antenna elements mean a plurality antenna elements constituting an antenna of the base station. As shown in FIG. 7, which depicts a configuration of a base station (to be described later), a base station transmits a signal using an antenna composed of 3 antenna elements connected to respective phase shifters that adjust phases of the respective antenna elements to finally control the beam direction of the corresponding antenna to be oriented toward the terminal.

According to an embodiment of the disclosure, the channel matrix is determined by the beam direction information included in the beam index under the assumption that the antenna element interval and the number of antenna elements, among the three factors determining the channel matrix as shown in FIG. 3, are set to values fixed according to initial design values of the base station rather than variables.

In detail, the channel matrix may be determined with Equation 1.

$$H = [h_1(\theta), h_2(\theta), \ldots, h_i(\theta)]$$

$$h_i(\theta) = \exp(-j*(2\pi)*(i-1)*d*\sin\theta/\lambda) \quad \text{Equation 1}$$

H: channel matrix, i: 1~number of antenna elements, d: antenna element interval, θ: beam direction, λ: wavelength For example, assuming 4 antenna elements, an antenna element interval of 1 mm, a beam direction of 30°, and a wavelength of 5 mm, the channel matrix H may be a 4×1 matrix as follows.

$$H = \begin{bmatrix} 1 \\ e^{\frac{-2\pi \sin 30°}{5}j} \\ e^{\frac{-4\pi \sin 30°}{5}j} \\ e^{\frac{-6\pi \sin 30°}{5}j} \end{bmatrix}$$

Meanwhile, the beam direction information included in the beam index may be sorted into horizontal direction information and vertical direction information. Although distinguishing between the horizontal direction information and vertical direction information increases calculation complexity, it may improve the accuracy of the beam direction information, which improves the preciseness of the channel matrix. In detail, if the beam direction information is sorted into the horizontal and vertical information, the channel matrix may be determined with Equation 2.

$$H = h(\theta) \otimes h(\varphi)$$

$$h(\theta) = [h_1(\theta), h_2(\theta), \ldots, h_i(\theta)]$$

$$h(\varphi) = [h_1(\varphi), h_2(\varphi), \ldots, h_k(\varphi)]$$

$$h_i(\theta) = \exp(-j*(2\pi)*(i-1)*d_h*\sin\theta/\lambda)$$

$$h_k(\varphi) = \exp(-j*(2\pi)*(k-1)*d_v*\cos\varphi/\lambda) \quad \text{Equation 2}$$

H: channel matrix, i: 1~number of horizontal antenna elements, $d_h$: horizontal antenna element interval, θ: beam direction, λ: wavelength, k: 1~number of vertical antenna elements, $d_k$: vertical antenna element interval, φ: beam's vertical direction, ⊗: Kronecker tensor product.

Similar to the above-described case, assuming 4 horizontal antenna elements, 4 vertical antenna elements, a horizontal antenna element interval of 1 mm, a vertical antenna element interval of 2 mm, a horizontal beam direction of 30°, a vertical beam direction of 60°, and a wavelength of 5 mm, the channel matrix H may be a 16×1 matrix as follows.

$$H = \begin{bmatrix} 1 \\ e^{\frac{-4\pi\cos 60°}{5}j} \\ e^{\frac{-8\pi\cos 60°}{5}j} \\ e^{\frac{-12\pi\cos 60°}{5}j} \\ e^{\frac{-2\pi\sin 30°}{5}j} \\ \left(e^{\frac{-2\pi\sin 30°}{5}j}\right)\left(e^{\frac{-4\pi\cos 60°}{5}j}\right) \\ \left(e^{\frac{-2\pi\sin 30°}{5}j}\right)\left(e^{\frac{-8\pi\cos 60°}{5}j}\right) \\ \left(e^{\frac{-2\pi\sin 30°}{5}j}\right)\left(e^{\frac{-12\pi\cos 60°}{5}j}\right) \\ e^{\frac{-4\pi\sin 30°}{5}j} \\ \left(e^{\frac{-4\pi\sin 30°}{5}j}\right)\left(e^{\frac{-4\pi\cos 60°}{5}j}\right) \\ \left(e^{\frac{-4\pi\sin 30°}{5}j}\right)\left(e^{\frac{-8\pi\cos 60°}{5}j}\right) \\ \left(e^{\frac{-4\pi\sin 30°}{5}j}\right)\left(e^{\frac{-12\pi\cos 60°}{5}j}\right) \\ e^{\frac{-6\pi\sin 30°}{5}j} \\ \left(e^{\frac{-6\pi\sin 30°}{5}j}\right)\left(e^{\frac{-4\pi\cos 60°}{5}j}\right) \\ \left(e^{\frac{-6\pi\sin 30°}{5}j}\right)\left(e^{\frac{-8\pi\cos 60°}{5}j}\right) \\ \left(e^{\frac{-6\pi\sin 30°}{5}j}\right)\left(e^{\frac{-12\pi\cos 60°}{5}j}\right) \end{bmatrix}$$

Meanwhile, if there are two terminals, the channel matrix may be determined with Equation 1 or 2 in a similar manner. In the case where there are two terminals, however, two channels are established between the base station and terminal 1 and terminal 2, resulting in a 16×2 channel matrix.

Likewise, if there are m terminals, the channel matrix becomes a 16×m matrix. Although the description is directed to a method for determining the channel matrix under the assumption that there is one terminal in an embodiment of the disclosure, it may be possible to estimate in a similar manner a channel matrix for the case where there are multiple terminals.

Once a channel matrix is determined as above, the base station transmits a signal based on the channel matrix determined by the base station as described with reference to FIG. 2; the disclosure proposes a hybrid beamforming method exploiting both digital beamforming and analog beamforming to minimize interference caused by beams formed between the base station and neighboring terminals.

For analog beamforming, an analog front end of the base station concentrates power in one direction by adjusting phase values of multiple antenna elements constituting an antenna.

Suppose that a base station is serving 4 terminals to help understand analog beamforming according to an embodiment of the disclosure. Assuming that the beam directions to first to fourth terminals that are included in the preferred beam indices transmitted by the 4 respective terminals are 01, 02, 03, and 04 in the line-of-sight (LOS) environment, a channel established with an analog beam formed to the first terminal may be expressed as Equation 3.

$$v^H(\theta_1)[v(\theta_1)v(\theta_2)v(\theta_3)v(\theta_4)] = [h_{11}h_{12}h_{13}h_{14}] \quad \text{Equation 3}$$

Here, v denotes a vector of phase values to be applied to respective antenna elements of a base station antenna. That is, the analog beam formed by the first antenna of the base station for transmitting a signal to the first terminal establishes a channel of $h_{11}$ to the first terminal, which leads to interference signals to the second, third, and fourth terminals as represented by $h_{12}$, $h_{13}$, and $h_{14}$.

By extending the concept of Equation 3, the channels established via the analog beams formed to the first to fourth terminals are expressed as Equation 4.

$$\begin{bmatrix} v^H(\theta_1) \\ v^H(\theta_2) \\ v^H(\theta_3) \\ v^H(\theta_4) \end{bmatrix} [v(\theta_1) \ v(\theta_2) \ v(\theta_3) \ v(\theta_4)] = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad \text{Equation 4}$$

That is, a typical analog beamforming method cannot cancel a beam interference. An analog beamforming matrix for forming an analog beam should be generated such that off-diagonal terms of the inverse matrix or the result matrix of the channel matrix as expressed by Equation 5 are all 0.

According to an embodiment of the disclosure, the base station may determine the channel matrix based on a beam index received from the terminal. In detail, the base station may determine an analog beamforming matrix for forming an analog beam using Equation 5.

$$V = (H^H * H)^{-1} * H^H \quad \text{Equation 5}$$

V: analog beamforming matrix, H: channel matrix

Equation 5 is characterized by making it possible for the base station to determine an analog beamforming matrix based on a preferred beam index fed back from a terminal rather than using a separate pilot symbol.

Figure 4:
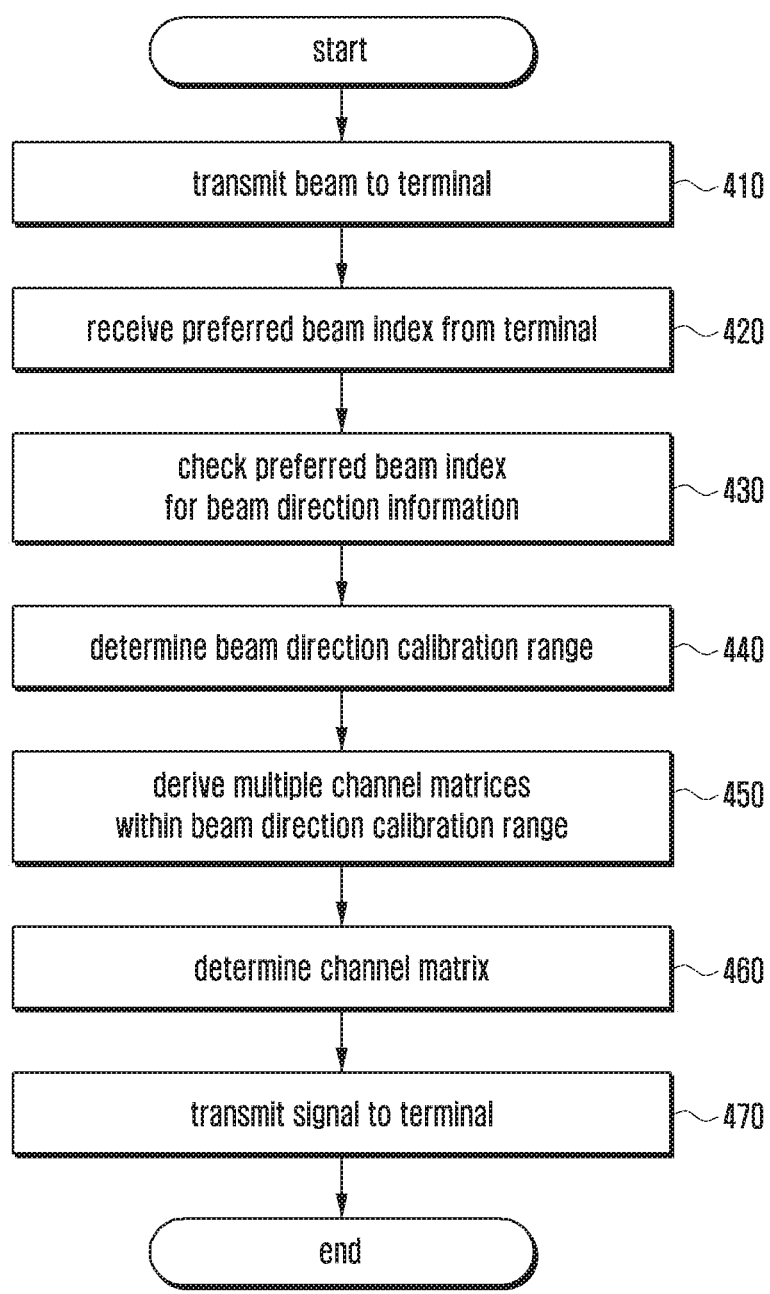
FIG. 4 is a flowchart illustrating a signal transmission method of a base station according to another embodiment of the disclosure.

FIG. 4 is a flowchart illustrating a signal transmission method of a base station according to another embodiment of the disclosure. FIG. 4 proposes a method for the base station to calibrate its beam direction to be oriented toward a target terminal.

The signal transmission method of the base station according to FIG. 4 is similar to that proposed in FIG. 2.

However, steps for calibrating the beam direction information of the preferred beam index are added after step 420, and the first of the added steps is step 430.

At step 430, the base station identifies the beam direction information of the preferred beam index. This is because the terminal located in a direction of 54° by way of example may transmit the beam direction information of the beam index indicative of 50° in the case where beams are formed at an angular interval of 10°.

At step 440, the base station determines a beam direction calibration range based on the beam direction information. If the base station transmits the beams at an angular interval of 10° and receives the beam direction information indicative of 50° as exemplified above, the beam direction calibration range may become 45°~55°.

At step 450, the base station derives multiple channel matrices within the calibration range. The multiple channel matrices may be derived from Equations 1 and 2 as described above.

At step 460, the base station selects a channel matrix indicating the best channel state between the base station and the terminal among the multiple channel matrices for transmitting a signal.

In detail, if multiple channels are established between the base station and the terminal through the multiple matrices, the base station may identify a channel matrix for signal transmission based on channel state information (CQI) fed back from the terminal to the base station.

In the case of using the signal transmission method of the base station according to FIG. 4, it is possible to determine first a channel matrix based on the preferred beam index and second calibrate the channel matrix based on the channel state information fed back from the terminal to the base station.

According to the embodiment of FIG. 4, although the terminal is located in a direction of 54° while the base station forms beams at an angular interval of 10°, the base station is capable of accurately identifying that the terminal is in the direction of 54°.

This method is capable of reducing a channel matrix error that is likely to be caused by a mismatch between the beam direction and the actual direction toward the terminal and further of reducing the channel matrix-based analog and digital beamform errors, resulting in improvement of analog and digital beamforming efficiency of the base station.

Because the channel matrix determination method based on Equation 1 or 2 requires an inverse matrix operation and the directions of the terminal in communication with the base station vary according to time, if the base station determines every time the phases of the analog beams that cause no interference, this may excessively increase complexity. Because the number of antenna elements that is considered to be used in an mmWave band is large, it is difficult for the base station to execute Equation 1 or 2 in a given short time.

By storing the best beamforming matrix per combination of directions of terminals in simultaneous communication with the base station in a memory and preparing a mapping table from which an analog beamforming matrix is output in response to an input of a beam direction combination $(\theta_1, \theta_2, \ldots, \theta_k)$, it is possible to perform interference-free analog beamforming without additional complexity.

Figure 5:
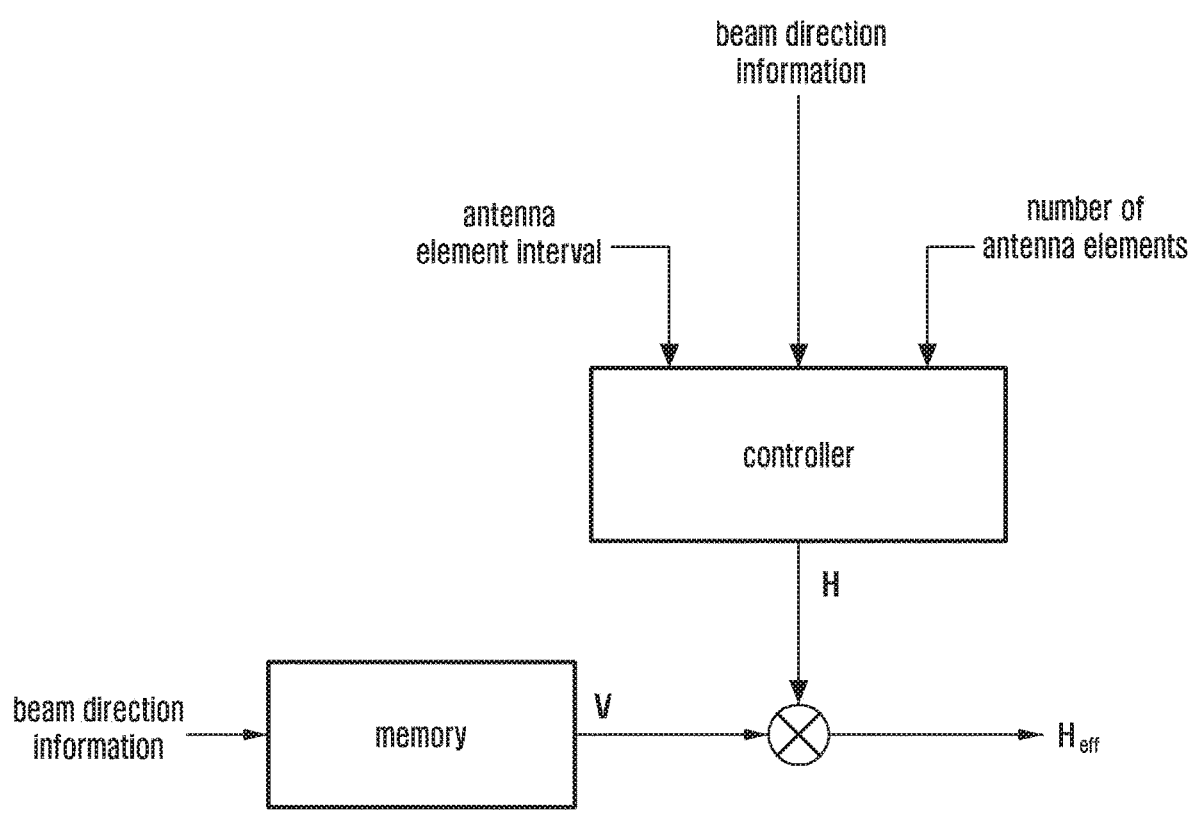
FIG. 5 is a diagram illustrating a method for determining an analog beamforming matrix according to an embodiment of the disclosure.

FIG. 5 is a diagram illustrating a method for determining an analog beamforming matrix according to an embodiment of the disclosure.

A controller of a base station determines a channel matrix H based on the antenna element interval, the beam direction information, and the number of antenna elements as described above; the analog beamforming matrix is determined by only the beam direction information retrieved from the mapping table that is separately stored in a memory.

This analog beamforming matrix determination method is capable of reducing control complexity and improving responsivity of the base station by obviating the necessity of a complex calculation process.

In FIG. 5, an analog beamforming matrix V and a channel matrix H are multiplied into a matrix $H_{\mathit{eff}}$, which is used for digital beamforming of the base station to be described hereinafter.

Typically, digital beamforming is capable of canceling the interference remaining after analog beamforming, and a digital beamforming matrix for use in performing the digital beamforming may be determined using Equation 6.

$$W=((V^*H)^{H*}(V^*H))^{-1}*(V^*H)^H \qquad \text{Equation 6}$$

W: Digital beamforming matrix, V: analog beamforming matrix, H: channel matrix

Substituting $H_{\mathit{eff}}$ of FIG. 5 into Equation 6 produces Equation 7.

$$W=(H_{\mathit{eff}}{}^H \times H_{\mathit{eff}})^{-1} \times H_{\mathit{eff}}{}^H \qquad \text{Equation 7}$$

Figure 6:
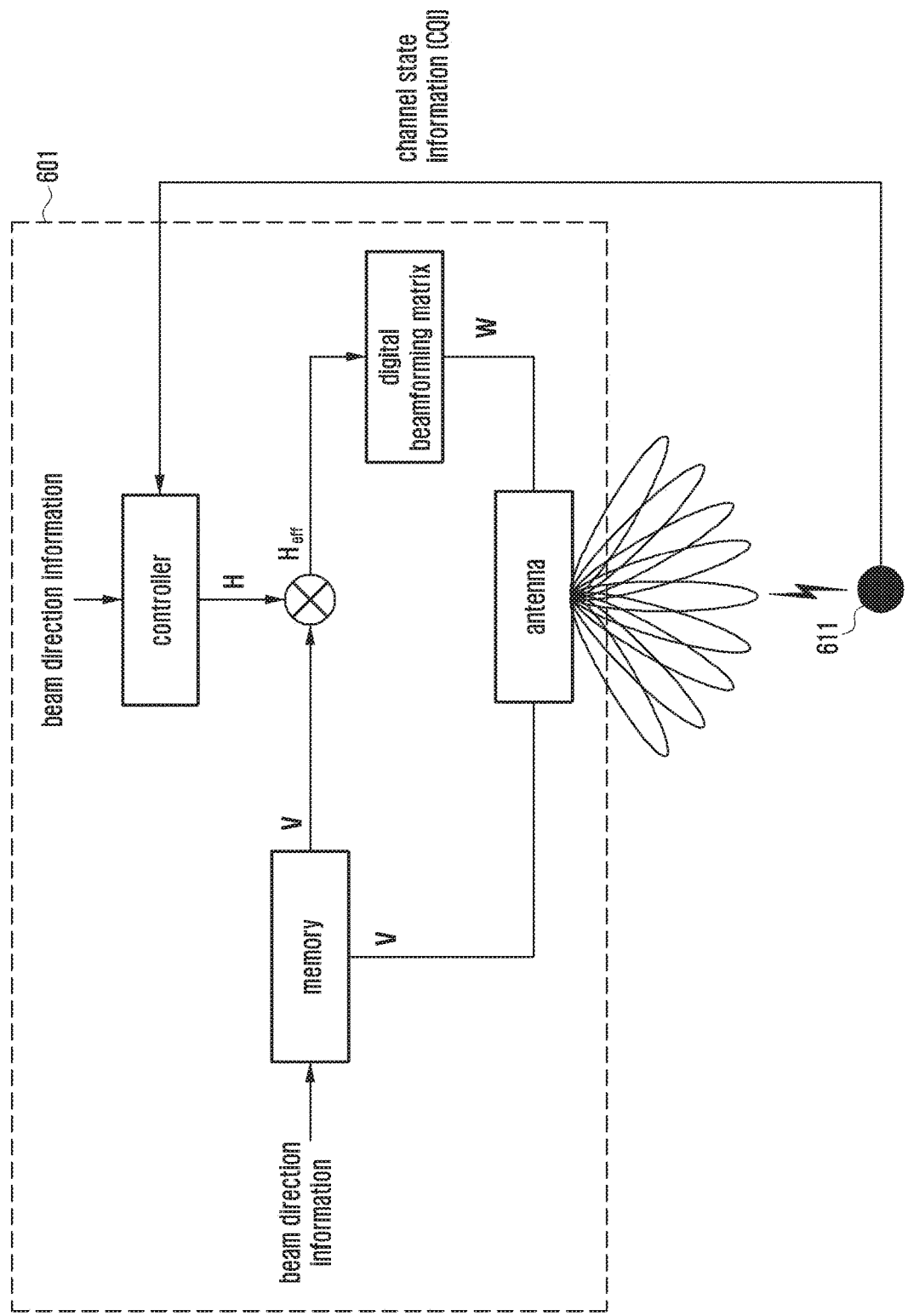
FIG. 6 is a diagram illustrating a hybrid beamforming procedure of a base station according to an embodiment of the disclosure.

FIG. 6 is a diagram illustrating a hybrid beamforming procedure of a base station according to an embodiment of the disclosure.

Descriptions are made of the operations of a base station 601 and a terminal 611 on the basis of the above description; an antenna of the base station 601 transmits a beam including a beam index to the terminal, and the terminal 611 determines a preferred beam index upon receipt thereof and transmits the preferred beam index to the base station 601.

The controller of the base station 601 may determine a channel matrix H based on beam direction information included in the preferred beam index and retrieve an analog beamforming matrix V from a mapping table stored in a memory.

The base station 601 may perform analog beamforming with the analog beamforming matrix V and simultaneously determine a digital beamforming matrix W by multiplying the analog beamforming matrix V by the channel matrix H to perform digital beamforming.

Furthermore, the terminal 611 may feed back channel state information (CQI) to the base station 601 in order for the controller of the base station 601 to calibrate the beam direction because the beam direction included in the initial beam index may be inaccurate.

FIG. 7 is a diagram illustrating a communication architecture between a base station 710 and terminals 711 and 713 according to an embodiment of the disclosure. In FIG. 7, two antennas each having three antenna elements are assumed.

In detail, a controller of the base station receives a beam index determined and transmitted by a terminal, determines a channel matrix between the base station and the terminal based on the preferred beam index, and controls a phase shifter based on the channel matrix to transmit a signal to the terminal.

The controller determines the channel matrix based on beam direction information, an antenna element interval, or a number of antenna elements that are included in the preferred beam index using the above described Equation 1 or 2.

The controller may transmit the signal by controlling the phase shifter based on a digital beamforming matrix and an analog beamforming matrix determined by the channel matrix. The analog and digital beamforming matrices may be determined by Equations 5 and 6.

The controller may identify the beam direction information of the preferred beam index and determine a beam direction calibration range based on the beam direction information. The controller may derive multiple channel matrices within the beam direction calibration range and select a channel matrix with the best channel state between the base station and the terminal as the channel matrix for use in transmitting the signal.

In this case, the controller may determine the channel matrix for transmitting the signal based on channel state information (CQI) fed back from the terminal to the base station.

As shown in FIG. 7, the base station 701 transmits analog beams to the terminals 711 and 713 and no pilot symbol via its antennas, and each of the terminals 711 and 713 transmits a beam index to a memory prepared separately for analog beamforming to determine an analog beamforming matrix, which is used for controlling the phase shifter to perform analog beamforming.

The controller may determine channel matrices based on the beam indices and channel state information (CQI) from the terminal 711 and 713, identify digital beamforming matrices based on the channel matrices and analog beamforming matrices retrieved from the memory, and control the phase shifter based on the digital beamforming matrices to perform digital beamforming.

Figure 8:
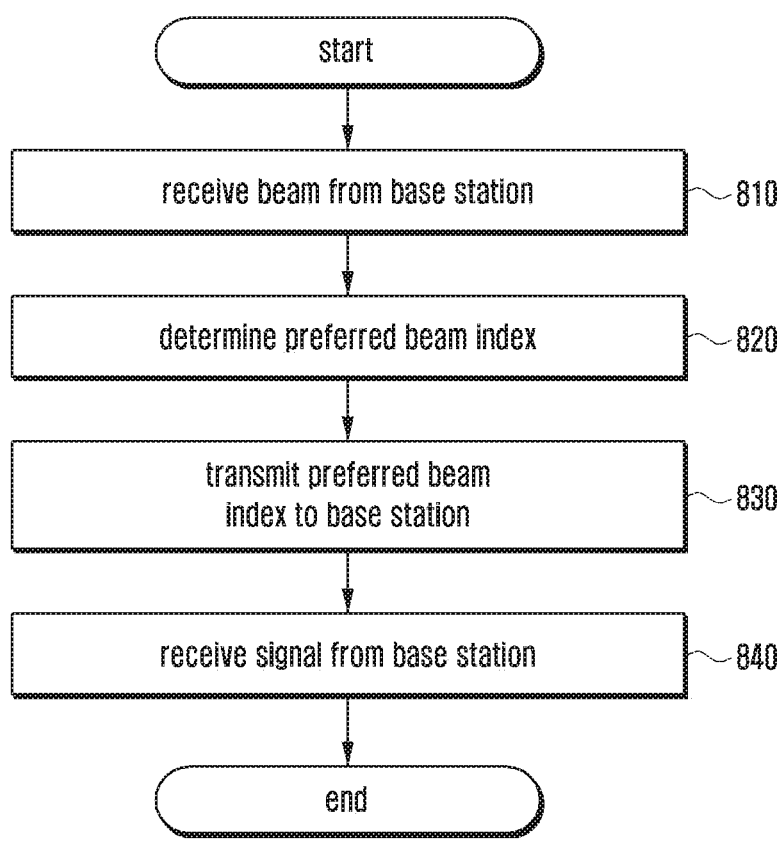
FIG. 8 is a flowchart illustrating a signal reception method of a terminal according to an embodiment of the disclosure.

FIG. 8 is a flowchart illustrating a signal reception method of a terminal according to an embodiment of the disclosure.

At step 810, the terminal may receive at least one beam index including beam direction information from a base station through at least one beam.

The terminal determines a preferred beam index among the at least one beam index at step 820, transmits the preferred beam index to the base station at step 830, and receives, at step 840, a signal transmitted by the base station based on the channel matrix identified by the preferred beam index.

The preferred beam index may be a beam index with the greatest beam power as a result of power measurement on beams transmitted by the base station. The base station may transmit a predetermined beam with a predetermined power at a predetermined timing, and the terminal measures power of the corresponding beam and determines a beam index corresponding to the best beam direction as the preferred beam index.

Figure 9:
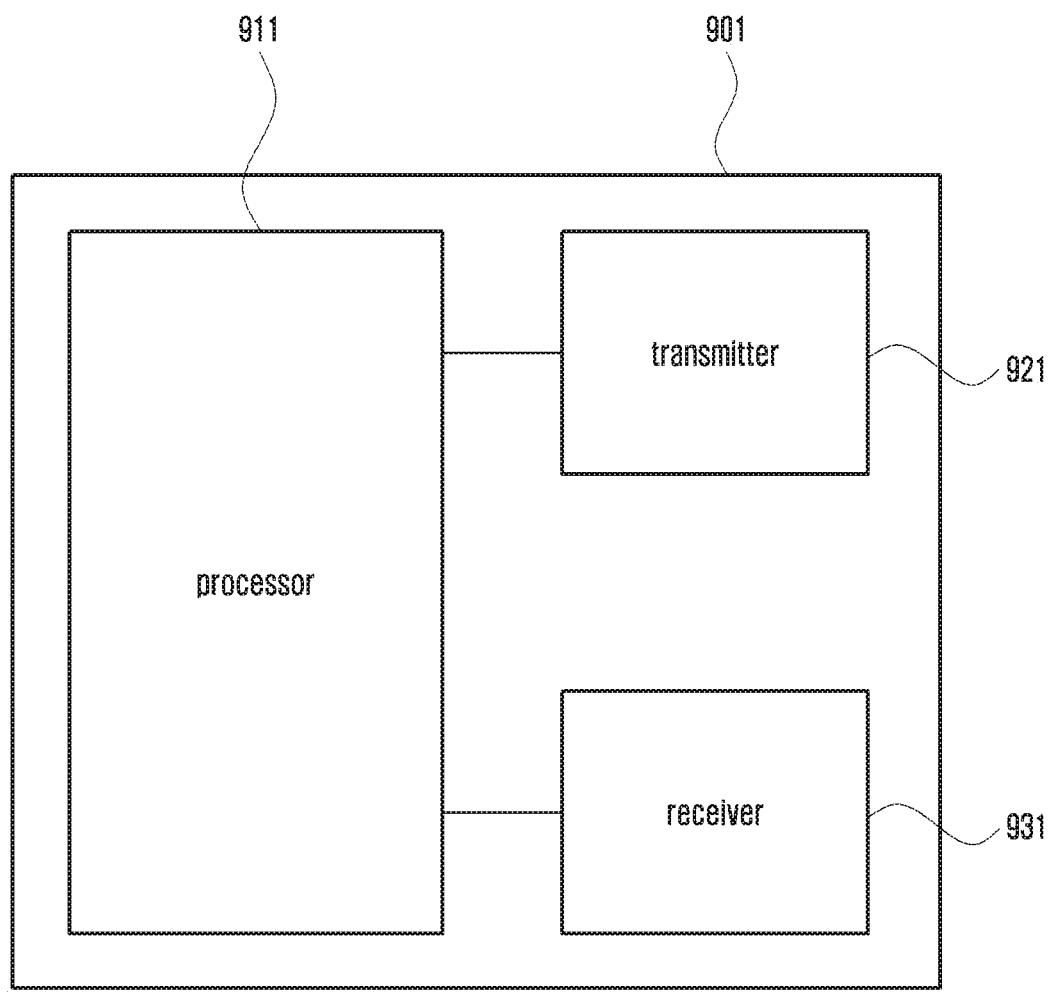
FIG. 9 is a block diagram illustrating a configuration of a terminal according to an embodiment of the disclosure.

FIG. 9 is a block diagram illustrating a configuration of a terminal according to an embodiment of the disclosure.

According to an embodiment of the disclosure, the terminal 901 may include a processor 911 for determining a preferred beam index among at least one beam index received from a base station, a transmitter 921 for transmitting the beam index to the base station, and a receiver 931 for receiving at least one beam including the beam index and a signal based on the channel matrix determined by the preferred beam index.

The embodiments disclosed in the specification and drawings are proposed to help explain and understand the disclosure rather than to limit the scope of the disclosure. It is obvious to those skilled in the art that various modifications and changes can be made thereto without departing from the broader spirit and scope of the invention. If necessary, the embodiments may be combined in whole or in part. For example, embodiments 1, 2, and 3 of the disclosure may be combined, in part or whole, with each other to form an embodiment for the operations of a base station and a terminal Although the embodiments are directed to an LTE system, it is obvious to apply them to other systems such as a 5G system or an NR system to form other alternative embodiments without departing from the spirit and scope of the disclosure.

The invention claimed is:

1. A signal transmission method of a base station in a wireless communication system, the method comprising:
transmitting a plurality of beam indexes to a plurality of terminals through a plurality of beams rather than through at least one pilot symbol, wherein the each of the plurality of beam indexes corresponds to each of beam direction information respectively;
receiving a plurality of preferred beam indexes determined by each terminal of the plurality of terminals;
based on the received plurality of preferred beam indexes, identifying an analog beamforming matrix retrieved from a mapping table in which each of the plurality of beam indexes corresponds to a different analog beamforming matrix, wherein the analog beamforming matrix is determined according to a channel matrix between the base station and the terminal based on a preferred beam index instead of a measurement of the at least one pilot symbol; and
transmitting a signal to the terminal based on the identified analog beamforming matrix,
wherein the channel matrix is determined based on the beam direction information corresponding to the plurality of the preferred beam indexes and a number of antenna elements among a plurality of antenna elements arranged in the base station.

2. The method of claim 1, wherein the channel matrix is determined using Equation 8:

$$H=[h_1(\theta), h_2(\theta), \ldots, h_i(\theta)]$$

$$h_i(\theta)=\exp(-j*(2\pi)*(i-1)*d*\sin\theta/\lambda) \qquad \text{Equation 8}$$

where H denotes the channel matrix, i denotes 1~ a number of antenna elements, d denotes an antenna element interval, θ denotes beam direction information, and λ denotes wavelength.

3. The method of claim 1, wherein the channel matrix is determined using Equation 9:

$$H=h(\theta)\otimes h(\varphi)$$

$$h(\theta)=[h_1(\theta), h_2(\theta), \ldots, h_i(\theta)]$$

$$h(\varphi)=[h_1(\varphi), h_2(\varphi), \ldots, h_k(\varphi)]$$

$$h_i(\theta)=\exp(-j*(2\pi)*(i-1)*d_h*\sin\theta/\lambda)$$

$$h_k(\varphi)=\exp(-j*(2\pi)*(k-1)*d_v*\cos\varphi/\lambda) \qquad \text{Equation 2}$$

where H denotes the channel matrix, i denotes 1~a number of horizontal antenna elements, $d_h$ denotes a horizontal antenna element interval, θ denotes a horizontal beam direction, λ denotes wavelength, k denotes 1~a number of vertical antennal elements, $d_k$ denotes a vertical antenna element interval, and φ denotes a vertical beam direction.

4. The method of claim 1, wherein the transmitting of the signal comprises transmitting the signal based on a digital beamforming matrix and the analog beamforming matrix that are determined by the channel matrix, the analog beamforming matrix being calculated using Equation 10:

$$V=(H^H*H)^{-1}*H^H \qquad \text{Equation 10}$$

where V denotes the analog beamforming matrix and H denotes the channel matrix, and the digital beamforming matrix being calculated using Equation 11:

$$W=((V^*H)^{H}*(V^*H))^{-1}*(V^*H)^{H} \quad \text{Equation 11}$$

where W denotes the digital beamforming matrix, V denotes the analog beamforming matrix, and H denotes the channel matrix.

5. The method of claim 4, wherein the channel matrix is determined using the following method:
   identifying beam direction information of the preferred beam index;
   determining a beam direction calibration range based on the beam direction information;
   deriving multiple channel matrices within the beam direction calibration range; and
   determining the channel matrix with a best channel state between the base station and the terminal, among the multiple channel matrices, as the channel matrix for transmitting the signal, the channel matrix for transmitting the signal being determined based on channel state information (CQI) fed back from the terminal to the base station in a case where multiple channels are formed between the base station and the terminal via the multiple channel matrices.

6. A base station in a wireless communication system, the base station comprising:
   an antenna configured to transmit a plurality of beam indexes to a plurality of terminals through a plurality of beams rather than through at least one pilot symbol, wherein each of the plurality of beam indexes corresponds to each of beam direction information respectively;
   a memory configured to store a mapping table outputting an analog beamforming matrix according to an input of a plurality of preferred beam indexes;
   a phase shifter configured to adjust a beam direction angle of the antenna; and
   a controller configured to:
      receive the plurality of preferred beam indexes determined by each terminal of the plurality of terminals,
      based on the received plurality of preferred beam indexes, identify an analog beamforming matrix retrieved from the mapping table in which each of the plurality of beam indexes corresponds to a different analog beamforming matrix, wherein the analog beamforming matrix is determined according to a channel matrix between the base station and the terminal based on a preferred beam index instead of a measurement of the at least one pilot symbol, and
      control the phase shifter to transmit a signal to the terminal based on identified analog beamforming matrix,
   wherein the channel matrix is determined based on the beam direction information corresponding to the plurality of the preferred beam indexes and a number of antenna elements among a plurality of antenna elements arranged in the base station.

7. The base station of claim 6, wherein the controller is further configured to determine the channel matrix using Equation 12:

$$H=[h_1(\theta),h_2(\theta),\ldots,h_i(\theta)]$$

$$h_i(\theta)=\exp(-j^*(2\pi)^*(i-1)^*d^*\sin\theta/\lambda) \quad \text{Equation 12}$$

where i denotes 1~a number of antenna elements, d denotes an antenna element interval, θ denotes the beam direction information, and λ denotes wavelength.

8. The base station of claim 6, wherein the controller is further configured to determine the channel matrix using Equation 13:

$$H=h(\theta)\otimes h(\varphi)$$

$$h(\theta)=[h_1(\theta),h_2(\theta),\ldots,h_i(\theta)]$$

$$h(\varphi)=[h_1(\varphi),h_2(\varphi),\ldots,h_k(\varphi)]$$

$$h_i(\theta)=\exp(-j^*(2\pi)^*(i-1)^*d_h^*\sin\theta/\lambda)$$

$$h_k(\varphi)=\exp(-j^*(2\pi)^*(k-1)^*d_v^*\cos\varphi/\lambda) \quad \text{Equation 13}$$

where i denotes 1~a number of horizontal antenna elements, $d_h$ denotes a horizontal antenna element interval, θ denotes a horizontal beam direction, λ denotes wavelength, k denotes 1~a number of vertical antennal elements, $d_k$ denotes a vertical antenna element interval, and φ denotes a vertical beam direction.

9. The base station of claim 6,
   wherein the controller is further configured to:
      transmit the signal by controlling the phase shifter based on a digital beamforming matrix and an analog beamforming matrix that are determined by the channel matrix, the analog beamforming matrix being calculated using Equation 14:

$$V=(H^H*H)^{-1}*H^H \quad \text{Equation 14}$$

where V denotes the analog beamforming matrix and H denotes the channel matrix, and the digital beamforming matrix being calculated using Equation 15:

$$W=((V^*H)^{H}*(V^*H))^{-1}*(V^*H)^{H} \quad \text{Equation 15}$$

where W denotes the digital beamforming matrix, V denotes the analog beamforming matrix, and H denotes the channel matrix,
      identify the beam direction information of the preferred beam index,
      determine a beam direction calibration range based on the beam direction information,
      derive multiple channel matrices within the beam direction calibration range, and
      determine the channel matrix with a best channel state between the base station and the terminal, among the multiple channel matrices, as the channel matrix for transmitting the signal, and
   wherein the channel matrix for transmitting the signal is determined based on channel state information (CQI) fed back from the terminal to the base station in a case where multiple channels are formed between the base station and the terminal via the multiple channel matrices.

10. A signal reception method of a terminal in a wireless communication system, the method comprising:
   receiving a plurality of beam indexes from a base station through a plurality of beams rather than through at least one pilot symbol, wherein the each of the plurality of beam indexes corresponds to each of beam direction information respectively;
   determining a plurality of preferred beam indexes among the plurality of beam indexes;
   transmitting the plurality of preferred beam indexes to the base station; and
   receiving a signal transmitted from the base station, based on an analog beamforming matrix retrieved from a mapping table in which each of the plurality of beam indexes corresponds to a different analog beamforming matrix, wherein the analog beamforming matrix is determined according to a channel matrix between the base station and the terminal based on a preferred beam index instead of a measurement of the at least one pilot symbol, and wherein the channel matrix is determined based on the beam direction information corresponding to the plurality of the preferred beam indexes and a number of antenna elements among a plurality of antenna elements arranged in the base station.

11. The method of claim 10, wherein the channel matrix is determined using Equation 16:

$$H=[h_1(\theta), h_2(\theta), \ldots, h_i(\theta)]$$

$$h_i(\theta)=\exp(-j*(2\pi)*(i-1)*d*\sin\theta/\lambda) \quad \text{Equation 16}$$

where H denotes the channel matrix, i denotes 1~a number of antenna elements, d denotes an antenna element interval, θ denotes the beam direction information, and λ denotes wavelength.

12. A terminal in a wireless communication system, the terminal comprising:

a transceiver; and a controller coupled with the transceiver and configured to:

receive a plurality of beam indexes from a base station through a plurality of beams rather than through at least one pilot symbol, wherein the each of the plurality of beam indexes corresponds to each of beam direction information respectively, determine a plurality of preferred beam indexes among the plurality of beam indexes, transmit the plurality of preferred beam indexes to the base station, and receive a signal transmitted from the base station, based on an analog beamforming matrix retrieved from a mapping table in which each of the plurality of beam indexes corresponds to a different analog beamforming matrix, wherein the analog beamforming matrix is determined according to a channel matrix between the base station and the terminal based on a preferred beam index instead of a measurement of the at least one pilot symbol, and wherein the channel matrix is determined based on the beam direction information corresponding to the plurality of the preferred beam indexes and a number of antenna elements among a plurality of antenna elements arranged in the base station.

\* \* \* \* \*